United States Patent [19]

Nigorikawa

[11] Patent Number: 4,589,055
[45] Date of Patent: May 13, 1986

[54] ROTOR SHAFT SUPPORT MECHANISM IN OSCILLATOR

[75] Inventor: Shigeru Nigorikawa, Kakuda, Japan

[73] Assignee: Alps Electric Co., Ltd., Japan

[21] Appl. No.: 697,286

[22] Filed: Feb. 1, 1985

[30] Foreign Application Priority Data

Feb. 2, 1984 [JP] Japan .................................. 59-13444

[51] Int. Cl.⁴ .............................................. H01G 5/06
[52] U.S. Cl. ................................................ 361/298
[58] Field of Search ............... 361/287, 292, 293, 296, 361/298, 299, 300

[56] References Cited

U.S. PATENT DOCUMENTS

| | | | |
|---|---|---|---|
| 1,951,661 | 3/1934 | Koepping | 361/298 |
| 2,153,532 | 4/1939 | Albert | 361/298 |
| 2,155,201 | 4/1939 | Nelson | 361/298 |
| 3,537,045 | 10/1970 | Ono | 361/299 X |
| 3,739,244 | 6/1973 | Tatsumi et al. | 361/298 |

Primary Examiner—Donald Griffin
Attorney, Agent, or Firm—Guy W. Shoup

[57] ABSTRACT

In an oscillator having a frame, a variable capacitor mounted in the frame and having a rotor and a stator, the rotor having a rotor shaft rotatably supported on the frame, a rotor shaft support mechanism comprises: two sets of rotor shaft support portions provided in the frame, one of the two sets of rotor support portions being formed in the opposing side plates of the frame and being adapted to support the rotor shaft in a transverse direction, and the other one of the rotor shaft support portions being formed in the upper and lower plates of the frame and being adapted to support the rotor shaft in another vertical direction, whereby the rotor shaft can be supported by desiredly selected one of the two sets of rotor support portions.

5 Claims, 6 Drawing Figures

ROTOR SHAFT SUPPORT MECHANISM IN OSCILLATOR

BACKGROUND OF THE INVENTION

1. Field of the Invention

The present invention relates to a rotor shaft mechanism, and particularly to a rotor shaft support mechanism in a smallsized oscillator such as a UHF oscillator incorporated in an RF modulator. Specifically, the present invention relates to a rotor shaft support mechanism for supporting a rotor shaft of a variable capacitor mounted on a frame.

2. Description of the Prior Art

FIG. 1 is an exploded perspective view showing the schematic structure of an example of the conventional RF modulator. In such a device, a circuit board 2 is provided in a shielding casing 1 and a connection plug 3 for externally connecting a circuit formed on the circuit board 2 is provided on a side plate of the shielding casing 1. A slot 2a is formed at a part of the circuit board 2, so that a UHF oscillator 4 is fixed in the slot 2a. This oscillator 4 is constituted by a metal frame 5 and a cover 6 covering the frame 5 in which a variable capacitor 8 is contained together with various kinds of electronic parts 7 such as transistors, diodes, resistors, etc. A rotor shaft 8b of the variable capacitor 8 is supported in holes formed in the side plates of the frame 5. A plurality of rotor vanes 8a are fixed on the rotor shaft 8 and stator vanes (not shown) are fixedly provided inside the frame 5 in opposition to the rotor vanes 8a. The rotor shaft 8b is inside of an operation hole 1a bored in the shielding casing 1 so that it can be adjusted from the outside of the shielding casing 1 by rotating the rotor shaft 8b.

Such an RF modulator shown in FIG. 1 is to be incorporated into a VTR product. Recently, as the varieties of the VTR products increase, the kinds of the RF modulator also increase in dimension and in operation mode. Thus, among the UHF oscillator products, there is no standard in the way to provide the variable capacitor 8 in the frame 5, that is in connection with the direction of the rotor shaft 8b.

In view of the above-mentioned circumstances, conventionally, the design of RF modulators or the like has been carried out in accordance with the kinds of VTR products, and the arrangement of the RF modulator and the UHF oscillator 4 to be incorporated into the RF modulator is different for each product. Thus, it is very difficult to establish standardization in design of the UHF oscillator 4.

SUMMARY OF THE INVENTION

An object of the present invention is, therefore, to solve the above-mentioned problems in the prior art.

Another object of the present invention is to provide a rotor support mechanism in which the mounting direction of a rotor shaft for channel selection can be desiredly selected in accordance with the kind of device such as an RF modulator, or the like, thereby providing a standardization of parts by using the same frame.

To attain the above-mentioned objects, according to an aspect of the present invention, in an oscillator comprising a frame, a variable capacitor is mounted in the frame and has a rotor and a stator, the rotor having a rotor shaft rotatably supported on the frame. The rotor shaft support mechanism comprises: two sets of rotor shaft support portions provided in the frame, one of the two sets of rotor support portions being formed in the opposing side plates of the frame and being adapted to support the rotor shaft in a transverse direction, the other one of the rotor shaft support portions being formed in the upper and lower plates of the frame and being adapted to support the rotor shaft in another vertical direction, whereby the rotor shaft can be supporting by desiredly selected one of the two sets of rotor support portions.

Other objects and advantages of the invention will become apparent during the following discussion of the accompanying drawings.

BRIEF DESCRIPTION OF THE DRAWINGS

FIGS. 2 et seq. shows an embodiment of the invention, in which:

FIG. 2 is a perspective view showing the frame of an oscillator;

PREFERRED EMBODIMENT OF THE INVENTION

Figure 2:
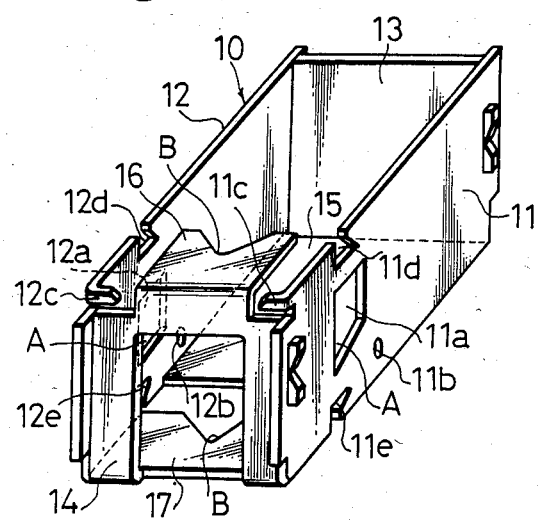

Referring to FIGS. 2 et seq., a preferred embodiment of the present invention will be described hereunder.

Figure 3A:
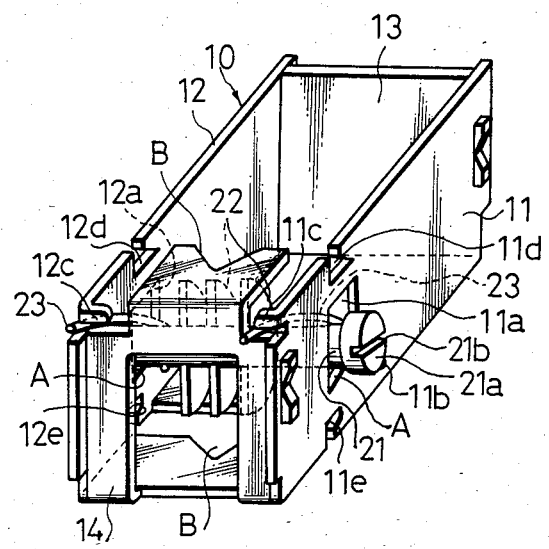
FIG. 3(A) is a perspective view showing the state in which the rotor shaft has been transversely mounted in the frame.

FIG. 2 is a perspective view showing a frame 10 of a UHF oscillator to be incorporated into an RF modulator, as an embodiment of the oscillator according to the present invention, and FIGS. 3(A) et seq. show the state in which a rotor shaft 21 has been attached on the frame 10.

Figure 3B:
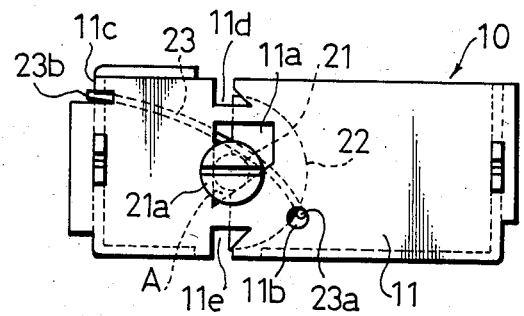
FIG. 3(B) is a side view of that shown in FIG. 3(A)

As shown in FIG. 2, the frame 10 is made up from a metal plate by press work. The frame 10 has a right side plate 11, a left side plate 12, a rear side plate 13, a front side plate, 14 and a bottom plate 15. A support window 11a is bored at a forward position in the right side plate 11a. Another support window 12a is bored at a corresponding position in the left side plate 12. A portion of one side, as shown in FIG. 3(B) of each of the windows 11a and 12a is formed into a V-shape by the edge portion of the window to form a shaft support portion A. These support windows 11a and 12a are for transversely supporting the rotor shaft. A spring fitting hole 11b is bored in the right side plate 11 at a lower position, and an upper front portion of the same right side plate 11 is inwardly bent to form a spring fitting portion 11c. Similarly to this, a spring fitting hole 12b and a spring fitting portion 12c are provided at corresponding positions in the left side plate 12.

The upper and lower ends of the above-mentioned front side plate 14 are inwardly bent to form parallel support portions 16 and 17 respectively. The tip end of each of the support portions 16 and 17 is cut into a V-shape to form a shaft support portion B. The shaft support portions B are for vertically supporting the rotor shaft. Spring fitting slots 11d and 12d are formed at the respective upper edges of the right and left side plates 11 and 12, and other spring fitting slots 11e and 12e are formed at the respective lower edges of the right and left side plates 11 and 12.

Next, attachment of the rotor shaft 21 to the frame 10 will be described.

FIG. 3(A) (perspective view) and FIG. 3(B) (plan view) show the state in which the rotor shaft has been transversely attached.

In the drawings, the reference numeral 21 designates the rotor shaft. A head 21a is formed at an end of the rotor shaft 21, and a slit 21b for purpose of actuation. A plurality of rotor vanes 22 are fixedly provided on the rotor shaft 21. Although omitted in the drawing, a stator is fixedly provided in the frame 10, and the stator vanes provided in the stator are placed in opposition to the above rotor vanes respectively with a very small gap therebetween.

In the case where the rotor shaft 21 is transversely mounted, the opposite ends of the rotor shaft 21 are inserted into the support windows 11a and 12a in the right and left side plates 11 and 12 respectively, so that the rotor shaft 21 is supported at the shaft support portions A formed in the V-shaped portions of support windows 11a and 12b. Springs 23 are used for supporting the rotor shaft 21. Each spring 23 is a wire spring. The respective base ends 23a of the springs 23 are bent into an L-shape and engaged, from the inside, with the respective spring fitting holes 11b and 12b bored in the right and left side plates 11 and 12. The rotor shaft 21 is pressed by the springs 23 which are made slightly curved, with the respective ends 23b engaged with the lower surface of the spring support portions 11c and 12c in the right and left side plates 11 and 12. Thus, the rotor shaft 21 is pressed by the springs 23 and urged against the V-shaped shaft support portions A of the respective windows 11a and 12a.

Figure 4A:
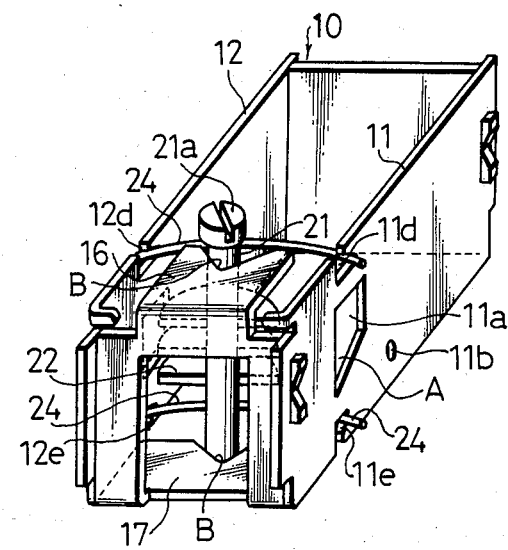
FIG. 4(A) is a perspective view showing the state in which the rotor shaft has been vertically mounted in the frame.
Figure 4B:
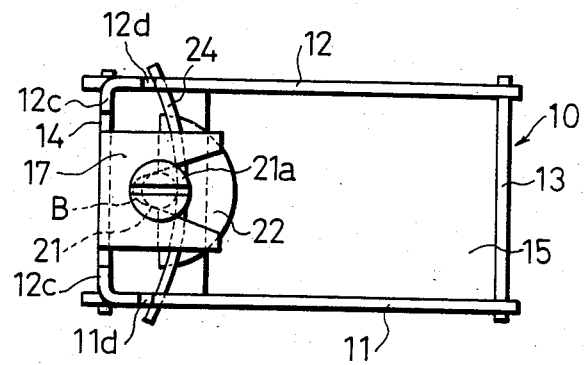
FIG. 4(B) is a plan view of that shown in FIG. 4(A).

FIG. 4(A) (perspective view) and FIG. 4(B) (plan view) show the state in which the rotor shaft 21 has been vertically attached.

In this case, the rotor shaft 21 is mounted in the V-shaped shaft support portions B formed in the upper and lower support portions 16 and 17 respectively. Two wire springs 24 are put on the opposite ends of the rotor shaft 21, and bent so that the respective opposite ends of the springs are engaged with the pairs of spring fitting slots 11d and 12d, and 11e and 12e respectively formed in the right and left side plates 11 and 12. Thus, the springs 24 urge the shaft 21 by the elasticity of the springs against the V-shaped shaft support portions B.

Figure 1:
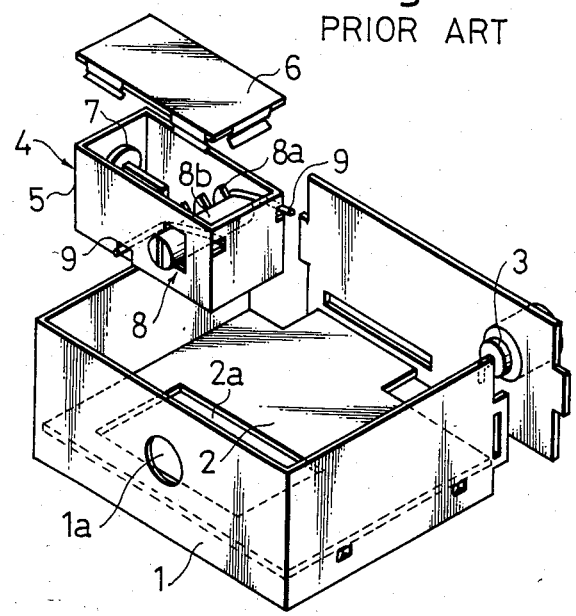
FIG. 1 is an exploded perspective view of the conventional RF modulator with an oscillator incorporated therein.

In this manner, the rotor shaft 21 is transversely or vertically mounted in the frame 10 together with the stator (not shown), and other electronic parts are also mounted in the frame 10. Then, a cover (corresponding to that indicated by the numeral 6 in FIG. 1) is attached to the frame 10 to complete the UHF oscillator. The UHF oscillator is incorporated into a high frequency device such as an RF modulator.

As described above, the present invention has the following advantages:

(1) In the frame, two pairs of rotor shaft support portions are provided so as to support a rotor shaft in either one of two directions transverse to each other, and spring fitting portions in which springs for pressing the rotor shaft against the support portions are engaged, are provided for each of the support portions, so that it is possible to mount the rotor shaft in either one of two directions, whereby various oscillators for a variety of devices or apparatuses may be produced by using a single kind of frame. That is, a frame may be commonly used for various kinds of devices and may be adapted to a variety of designs.

(2) Since a frame is commonly used for a variety of devices, the standardization of the mold for the press work for forming such frames can be realized. Further, the jigs are also standardized to realize a reduction in cost.

What is claimed is:

1. In an oscillator comprising a frame, a variable capacitor mounted in said frame and having a rotor and a stator, said rotor having a rotor shaft rotatably supported on said frame, a rotor shaft support mechanism comprising:

two sets of rotor shaft support means provided in said frame, one of said two sets of rotor support means being adapted to support said rotor shaft in one direction, the other one of said rotor shaft support means being adapted to support said rotor shaft in the other direction which is not parallel to said one direction, said rotor shaft being supported by a selected one of said two sets of rotor support means so that said rotor shaft extends in a selected one of said one and the other directions; and spring means for urging said rotor shaft against said selected one of said two sets of rotor shaft support means.

2. A rotor shaft support mechanism according to claim 1, in which said one and the other directions are vertical and transverse ones with respect to said frame.

3. A rotor shaft support mechanism according to claim 1, in which said frame has a configuration of a rectangular parallelopiped constituted by a first set of two opposing plates each extending substantially parallel in a first direction, a second set of two opposing plates each extending substantially parallel in a second direction which is substantially parallel to said first direction, and a third set of opposing plates extending substantially parallel in a third direction which is substantially perpendicular to each of said first and second directions, said one and the other directions being selected from said first, second and third directions.

4. A rotor shaft support mechanism according to claim 3, in which said first and second sets of opposing plates are side plates of said frame and said third set of opposing plates are upper and lower plates of said frame, and in which said one set of rotor shaft support means are provided in a selected one set of said first and second sets of opposing side plates, and said the other set of rotor shaft support means are provided in said third set of upper and lower plates.

5. A rotor shaft support mechanism according to claim 1, in which said spring means includes a set of wire springs, and in which said two sets of spring support means are provided in said frame respectively for said two rotor shaft support means, said wire springs being supported by a selected one of said two sets of spring support means associated with said selected one of said two sets of rotor shaft support means.

* * * * *